Figure 1:
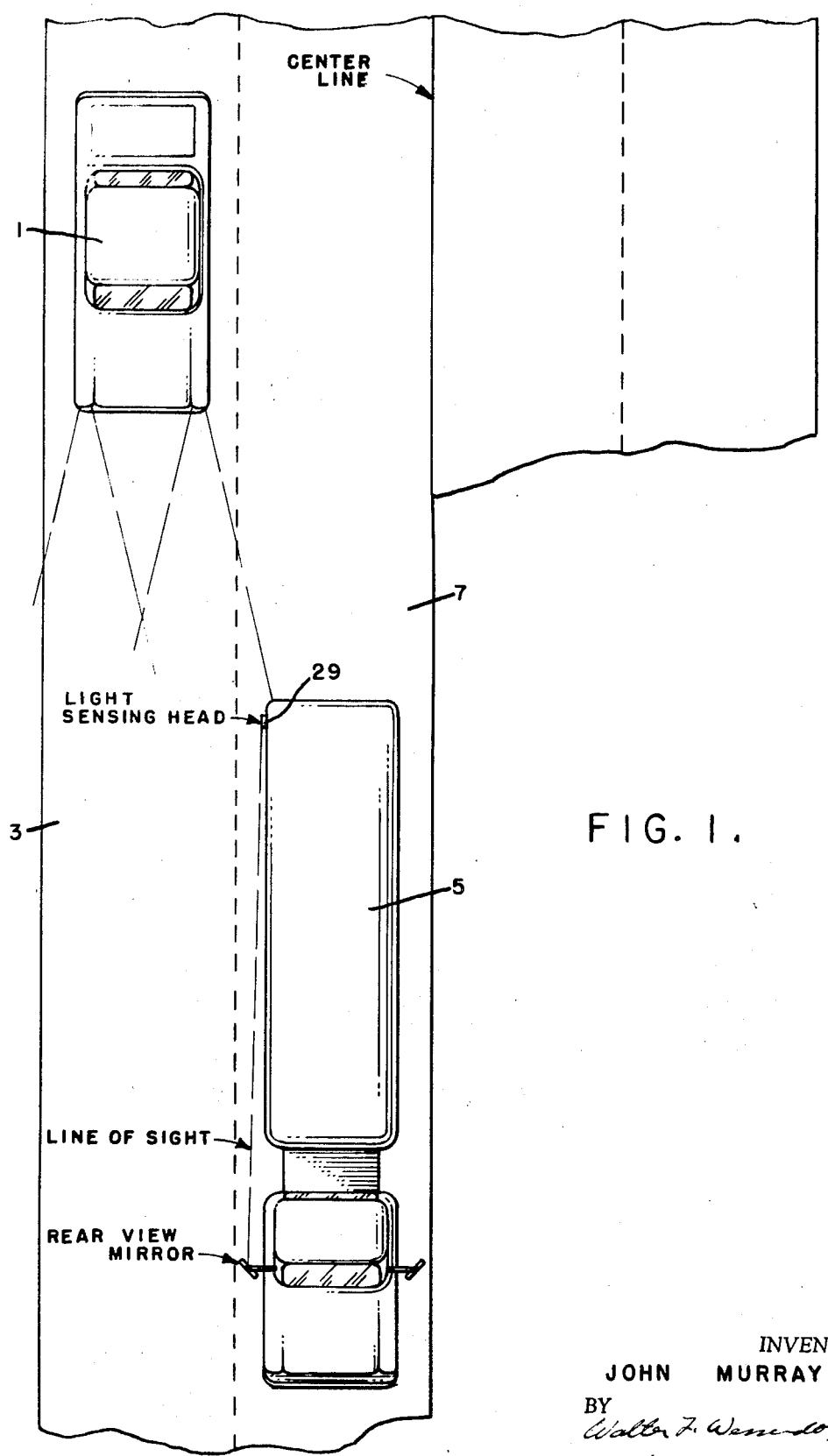

United States Patent

[11] 3,601,792

| | | | |
|---|---|---|---|
| [72] | Inventor | John Murray 1022 Central Avenue, Albany, N.Y. 12205 | |
| [21] | Appl. No. | 845,680 | |
| [22] | Filed | July 29, 1969 | |
| [45] | Patented | Aug. 24, 1971 | |

[54] VEHICLE PASSING DEVICE
2 Claims, 2 Drawing Figs.

[52] U.S. Cl. .................................................. 340/34, 340/81
[51] Int. Cl. .................................................. B60q 1/38
[50] Field of Search .................................... 340/32–34, 104, 79, 80, 85

[56] References Cited
UNITED STATES PATENTS

| 1,346,567 | 7/1920 | Stover | 340/79 UX |
| 2,025,349 | 12/1935 | Jabusch | 340/85 UX |
| 2,732,539 | 1/1956 | Andresen | 340/34 X |
| 2,771,594 | 11/1956 | Gourdou | 340/34 |
| 2,873,436 | 2/1959 | Avrea | 340/80 X |
| 3,026,498 | 3/1962 | Galliers | 340/104 |
| 3,192,437 | 6/1965 | Meyer | 340/34 X |

FOREIGN PATENTS

| 1,129,204 | 9/1956 | France | 340/33 |
| 698,675 | 11/1940 | Germany | 340/34 |
| 513,177 | 10/1939 | Great Britain | 340/251 |
| 154,951 | 6/1956 | Sweden | 340/34 |

*Primary Examiner*—John W. Caldwell
*Assistant Examiner*—Kenneth N. Leimer
*Attorney*—Walter F. Wessendorf, Jr.

ABSTRACT: A light-sensing head and indicator light in combination with a passing vehicle's conventional, directional signal system for use during nighttime driving to indicate when the passing vehicle can safely return to the driving lane in which the passed vehicle is proceeding.

INVENTOR.
JOHN MURRAY

VEHICLE PASSING DEVICE

This invention relates to a vehicle passing device in combination with and operatively associated with a passing vehicle's conventional, directional signal system for use during nighttime driving to indicate to the operator of the passing vehicle when the passing vehicle can safely return to the driving lane in which the passed vehicle is proceeding.

During nighttime driving conditions, passing vehicles such as tractor trailers and "double bottom" trailer rigs, trucks, buses and other lengthy vehicles and lengthy vehicle combinations experience and encounter difficulty in safely passing another vehicle and returning to the lane in which the passed vehicle is proceeding. The operator of the passing vehicle sometimes misjudges the distance and clearance he must proceed beyond the passed vehicle before the operator can safely return to the driving lane in which the passed vehicle is proceeding, and, in returning to the driving lane in which the passed vehicle is proceeding, the operator of the passing vehicle sometimes "cuts off" the passed vehicle thereby causing or creating an imminent accident or accident situation on the highway.

Among the factors which individually and/or collectively contribute to the misjudgement on the part of the operator of the passing vehicle, depending of course upon the particular road and traffic conditions then and there prevailing on the highway, are: the operator's necessary reliance upon his rear-view mirror in making his judgment as to when he can safely return to the driving lane after passing another vehicle; miscalculation by the operator of the length of his vehicle or vehicle combination; human error on the part of the operator; the operator of the passing vehicle being "blinded" by the high beam of the passed vehicle the operator of the passing vehicle being "blinded" by the headlights of oncoming traffic; fatigue on the part of the operator of the passing vehicle; acceleration of the passed vehicle while being passed by the passing vehicle; the difference between macadam and concrete road surfaces, and the type of highway markings; and the difference in passing another vehicle on a grade, downgrade or level.

Accordingly, the object of this invention is to contribute to the solution of the discussed problems of the art by providing a light-sensing head and indicator light operatively associated with and in combination with the passing vehicle's conventional, directional signal system to indicate to the passing vehicle's operator when his passing vehicle has sufficiently cleared and proceeded beyond the passed vehicle in order that the operator can then safely return his passing vehicle to the driving lane in which the passed vehicle is proceeding.

Figure 2:
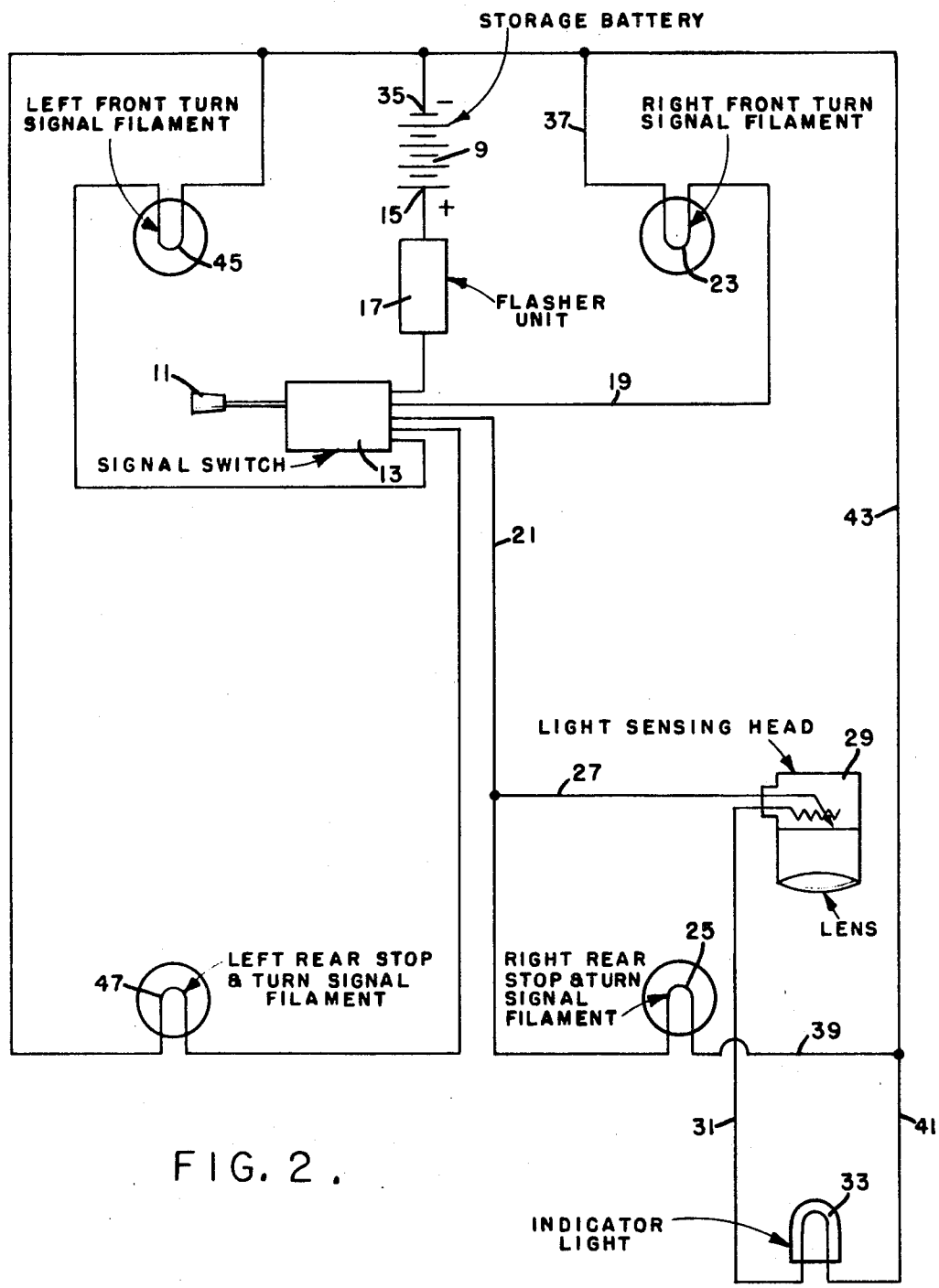

This object and other objects of this invention should be discerned and appreciated from the detailed specification taken in conjunction with the drawings, wherein like reference numerals refer to similar parts throughout the several views, in which:

FIG. 1 shows a view of a tractor trailer, having the light-sensing head of the invention, passing a passenger vehicle on a four-lane highway; and FIG. 2 shows a schematic circuit diagram of the invention.

To facilitate the understanding of the invention, a nomenclature list is hereby provided:

NOMENCLATURE - VEHICLE PASSING DEVICE
1 passenger vehicle
3 driving lane
5 tractor trailer
7 passing lane
9 storage battery
11 lever
13 signal switch
15 positive terminal
17 flasher unit
19 lead
21 lead
23 right front turn signal filament
25 right rear turn signal filament
27 lead
29 light-sensing head
31 lead
33 indicator light
35 negative terminal
37 lead
39 lead
41 lead
43 return lead
45 left front turn signal filament
47 left rear turn signal filament As shown in FIG. 1 of the drawings, passenger vehicle 1 is proceeding in the driving lane 3 and tractor trailer 5 has passed and is proceeding in the passing lane 7 preparatory to executing a right turn to return to and to resume proceeding in the driving lane 3.

Depending upon the relative speeds of the passing tractor trailer 5 and the passed passenger vehicle 1, the operator of the tractor trailer 5 must decide and determine how far ahead his tractor trailer 5 must proceed in the passing lane 7 during nighttime driving conditions to provide sufficient distance and clearance between the vehicles in order that tractor trailer 5 can safely return to the driving lane 3 without "cutting off" the passenger vehicle 1.

As shown in FIG. 2 of the drawings the storage battery 9 of the tractor trailer 5 supplies the power for the conventional, directional signal system. After the operator of the tractor trailer 5 has passed the passenger vehicle 1 and is proceeding in the passing lane 7 preparatory to making a right turn into the driving lane 3, the operator appropriately actuates the lever 11 of signal switch 13, and power is thereby applied from the positive terminal 15 of storage battery 9 to the flasher unit 17. Flasher unit 17 essentially supplies a pulsing power through leads 19 and 21 to intermittently light the right front turn signal filament 23 and the right rear turn signal filament 25, respectively. Flasher unit 17 also supplies pulsing power by lead 27 to a series-connected, photosensitive, light-sensing head 29 and by lead 31 to indicator light 33. This pulsing electrical power returns to the negative terminal 35 of storage battery 9 by leads 37, 39 and 41, as shown, which are connected to return lead 43.

Light-sensing head 29 functions as a "switch," and the circuit through light-sensing head 29 to indicator light 33 is not completed until this "switch" is closed. The "switch" of light-sensing head 29 is not closed until tractor trailer 5 is sufficiently past and beyond passenger vehicle 1 such that the light from the headlights of passenger vehicle 1 strike the light-sensing head 29 to close this "switch" to complete the circuit. When the light from the headlights of passenger vehicle 1 strike the light-sensing head 29, the resistance to current flow of light-sensing head 29 is lowered to a sufficiently low value to allow current to flow through lead 31 thereby intermittently lighting indicator light 33 and causing it to flash.

Indicator light 33 can be located immediately adjacent to light-sensing head 29 in order that the operator of tractor trailer 5 can pick up the flashing indicator light 33 by means of his line of sight from the right rear view mirror to light-sensing head 29, as shown in FIG. 1. Indicator light 33 can also be located on the dash in the cab of the tractor trailer 5, on the right rear view mirror, or wherever else preferred.

When the operator returns his tractor trailer 5 to the driving lane 3 and cancels out his flashing right directional signals, the circuit to indicator light 33 will be open and indicator light will cease flashing.

The light-sensing head 29 is disposed relative to the right rear portion of the tractor trailer 5 such that the lights from the passenger vehicle's headlights will only strike the light-sensing head 29 when the tractor trailer 5 has passed sufficiently beyond the passenger vehicle to provide ample distance and clearance for the tractor trailer 5 to safely return to the driving lane 3. It should be appreciated that the light-sensing head 29 can be adjustably disposed relative to the right rear portion of tractor trailer 5 to accommodate the practical operating speed ranges of tractor trailer 5 inclusively to functionally accommodate and operate over the practical, relative speed ranges of the passing and passed vehicles.

If the tractor trailer 5 has not passed sufficiently beyond the passenger vehicle 1, the lights from the passenger vehicle's headlights will not strike the photosensitive, light-sensing head 29, and hence the resistance to current flow of the light-sensing head 29 will remain high thereby limiting current flow through lead 31 and preventing indicator light 33 from being lighted.

It should be obvious that light-sensing head 29 must be located in the remote right rear portion of any vehicle or lengthy vehicle combination. For example, the case of a "double bottom" trailer rig, the light-sensing head 29 must be disposed in the remote right rear portion of the last rig.

Also shown in FIG. 2 are the left front turn signal filament 45 and the left rear turn signal filament 47. The light-sensing head 29, of course, is not operatively connected with filaments 45 and 47. However, it should be appreciated that it is within the concept of this invention to similarly dispose another light-sensing head relative to the left rear portion of the tractor trailer 5 or other vehicle and to operatively connect same with filaments 45 and 47 such that the device can be utilized similarly to pass a vehicle on the right and to safely return to the lane in which the passed vehicle is proceeding.

It should further be appreciated that there is no practical limitation as to the vehicle with which this invention can be utilized. The description of this invention and its operation with respect to passenger vehicle 1 as the passed vehicle is for purposes of description only.

Having thusly described my invention, I claim:

1. A vehicle passing device in combination with the directional signal system of a passing vehicle for indicating, during nighttime driving conditions, when the passing vehicle has proceeded sufficiently in the passing lane to allow sufficient clearance and distance for the passing vehicle to safely return to the driving lane in which the passed vehicle is proceeding upon directional signalling by the passing vehicle for such return; said directional signal system comprising a power source, a turn signal switch having a lever, a flasher unit, and right and left, front and rear turn signal filaments, said flasher unit being connected to said power source and, upon completion of a circuit to said flasher unit from said power source, said flasher unit supplying pulsing power, said signal switch being connected to said flasher unit and turn signal filaments such that upon appropriate manipulation of said turn signal lever a circuit is completed to said right front and rear turn signal filaments to intermittently light same, or a circuit is completed to said left front and rear turn signal filaments to intermittently light same; said vehicle passing device comprising a substantially rearwardly directed, photosensitive, light-sensing head mounted adjacent the rear of the passing vehicle and an indicator light, said light-sensing head being connected to said indicator light and to said flasher unit through said signal switch, said light-sensing head having resistance to current flow and whose whose resistance is responsive to the intensity of illumination provided y the passed vehicle's headlights to lower such resistance sufficiently to allow current flow; and said light-sensing head operatively functioning to allow said indicator light to flash when the passing vehicle has proceeded sufficiently in the passing lane to allow clearance and distance for the passing vehicle to safely return to the driving lane in which the passed vehicle is proceeding and at which time the intensity of illumination directed upon said light-sensing head from the headlights of the passed vehicle lowers the resistance to current flow of said light-sensing head sufficiently to complete the pulsing power circuit to said indicator light.

2. The vehicle passing device in accordance with claim 1, wherein said light-sensing head is connected to said flasher unit through said signal switch such that when said signal switch lever is manipulated to intermittently light said right front and rear turn signal filaments, said indicator light will flash when the resistance of said light-sensing head is lowered sufficiently for current flow from said flasher unit to said indicator light.